Patented Jan. 9, 1951

2,537,034

UNITED STATES PATENT OFFICE 2,537,034

PURIFICATION OF COMMERCIAL SODA ASH

Ruth E. Churchward, Boulder City, Nev., assignor to the United States of America as represented by the Secretary of the Interior No Drawing. Application January 19, 1949, Serial No. 71,755

3 Claims. (Cl. 23—63)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the Act of April 30, 1928 (Ch. 460, 45 Stat. L. 467).

This invention relates to the purification of alkali metal carbonates, and more particularly, to the purification of commercial soda ash or other impure forms of sodium carbonate for employment in the production of cobalt carbonate.

In the electrowinning of metallic cobalt, it is essential that the cobalt salt employed in the electrolyte be of a very high purity. Cobalt carbonate is a highly desirable cobalt salt for cobalt electrowinning and is customarily prepared by precipitation of the cobalt carbonate from a cobalt sulfate solution by adding sodium carbonate thereto. Ordinary commercial soda ash is a cheap and convenient form of alkali metal carbonate to use in the cobalt carbonate precipitation, but unfortunately contains impurities, many unidentified, which detrimentally influence the subsequent electrowinning step to produce cracked, split and scaly metallic cobalt deposits. While the exact nature of the impurities removable by this invention is not fully understood, it has definitely been ascertained that the alkali carbonates purified in accordance with this invention produce excellent deposits of metallic cobalt during the electrowinning thereof.

This invention, accordingly, has for an object the production of purified alkali metal carbonates and bicarbonates. Another object is the production of purified soda ash solutions which are well suited for the precipitation of pure cobalt carbonate from cobalt sulfate solutions. Other and further objects will be apparent or will appear hereinafter as the ensuing description proceeds.

These objects are accomplished in accordance with this invention wherein an alkali metal carbonate is purified by forming a concentrated aqueous solution thereof, then treating the thus-formed solution with an excess of a soluble sulfide to precipitate impurities which form insoluble sulfides, then removing the formed precipitate, treating the resulting solution with a quantity of cobalt sulfate, at least chemically equivalent to the excess soluble sulfide in the solution, to form a cobalt sulfide precipitate containing additional impurities, removing the formed precipitate, then treating the solution with ferric sulfate to form a precipitate of insoluble ferric hydroxide and recovering the thus-purified solution from the impurity-containing ferric hydroxide residue. The resulting purified alkali metal carbonate solution may be directly employed or, if desired, it may be evaporated to dryness to yield a solid purified alkali metal carbonate.

While the exact chemistry of the purification reaction is not fully understood, and therefore applicant does not wish to be bound by any theoretical explanation herein advanced, it nevertheless appears from present information that the soluble sulfide precipitates and removes metals capable of forming insoluble sulfides under alkaline conditions, such as, for example, copper and related sulfides. The excess of sulfide treatment reagent is then removed by treating the solution with an innocuous metallic sulfate capable of forming an insoluble sulfide. It is preferred to employ cobalt sulfate since the subsequent utilization of purified alkali metal carbonate in cobalt electrowinning procedures does not introduce any harmful impurity. Thereafter, the treatment with ferric sulfate to form insoluble ferric hydroxide removes by absorption or adsorption, or perhaps, in part, by chemical reaction, the last traces of harmful impurities, including colloidal or peptized sulfides which may still be in the solution. It will be apparent that the reagents employed and the sequence of operations provides a unitary process wherein each reagent and treatment step cooperates to remove its share of impurities while at the same time removing residual traces of prior treatment reagents.

Suitable alkali metal carbonates for purification in accordance with this invention include the carbonates and bicarbonates of sodium, potassium and lithium. The invention finds its greatest application, however, in the purification of impurity-containing commercial soda ash. Desirably, the soda ash is treated in a concentrated aqueous solution, such as, for example, one containing sufficient soda ash to have a gravity of 24° Bé. However, soda ash or other alkali metal carbonate or bicarbonate solutions having a higher or lower concentration may be similarly purified in accordance with this invention, but it is generally preferred to employ a concentrated aqueous solution as above specified.

Suitable soluble sulfides for employment in this invention include sodium sulfide, potassium sulfide, barium sulfide, calcium sulfide or other soluble sulfide. In general, it is preferred to employ a sulfide having a cation the same as the cation of the carbonate or bicarbonate being purified inasmuch as additional cationic impurities cannot thereby be introduced into the alkali metal carbonate solution being purified. In the case of soda ash or sodium bicarbonate, it is preferred to employ sodium sulfide as the soluble sulfide precipitating agent. The sodium sulfide or other soluble sulfide is preferably incorporated with the soda ash or other alkali metal carbonate solution by first dissolving the sodium sulfide in water and then adding the aqueous sulfide solution to the concentrated soda ash solution. Sufficient quantity of soluble sulfide is employed to react with the sulfide-forming impurities contained in the soda ash solution being treated. In general, for ordinary commercial soda ash containing the usual amounts of impurities, about 0.5 gram of soluble sulfide is required per liter of concentrated soda ash solution undergoing treatment. Greater amounts may be employed but may require higher quantities of subsequent treatment reagents to remove the excess sulfides. Similarly, lesser quantities of soluble sulfide may be employed depending in part upon the quantities of impurities to be removed but some impurities may be thereby allowed to remain in the product.

In general, it is desirable to introduce the soluble sulfide in the form of a concentrated aqueous solution inasmuch as the soda ash solution being purified is not thereby diluted unduly. A saturated aqueous solution of sulfide is preferred.

Upon addition of the sodium sulfide or other soluble sulfide to the soda ash or other alkali metal carbonate solution undergoing purification, a precipitate immediately forms which is usually dark in color and will vary in quantity depending upon the amount of impurities present in the soda ash solution undergoing treatment. It is usually desirable to add a slight excess of soluble sulfide to insure complete precipitation of the sulfide-forming impurities.

The soda ash solution or other alkali metal carbonate or bicarbonate solution undergoing purification is separated from the impurities, precipitated as above described with soluble sulfide, by filtration, centrifuging, or sedimentation followed by decantation of the purified solution. In general, it is preferred to filter the solution to remove the precipitated sulfides.

After removal of the sulfide precipitate, the solution is then treated with a salt of an innocuous metal capable of forming an insoluble sulfide in concentrated soda ash solutions. Preferably, cobalt sulfate is employed since in subsequent cobalt electrowinning, no undesirable impurity is thereby introduced into the soda ash solution. However, for other uses of the purified soda ash solution other metal salts capable of forming insoluble sulfides may be employed, with perhaps some loss of efficiency.

In general, the excess sulfide is removed by treating the soda ash or other alkali metal carbonate solution with an amount of cobalt sulfate which is stoichiometrically equivalent to the excess sulfide remaining in the solution. However, larger amounts of cobalt sulfate may be employed but will be lost in the process since the excess will be precipitated as carbonate and of necessity have to be reworked. The cobalt sulfate is preferably added in the form of a concentrated solution and in general only about one-tenth to five-tenths grams per liter of cobalt sulfate is required, based on the quantity of soda ash solution being purified. A few simple trials will give the minimum quantity of cobalt sulfate needed to precipitate the excess of soluble sulfide. During this precipitation, not only is the excess soluble sulfide removed, but traces of impurities harmful to subsequent electrowinning procedures are also removed.

The precipitate of cobalt sulfide with its adsorbed or otherwise entrapped impurities is removed from the soda ash or other alkali metal carbonate solution undergoing treatment by filtration, centrifuging, sedimentation and decantation or the like.

Preferably, for rapidity, the soda ash solution is filtered to remove the cobalt sulfide precipitate. The solution thus recovered is then preferably heated to 50 to 60° C. and treated with from 0.5 to 2.5 grams per liter of ferric sulfate, preferably by addition of a concentrated aqueous solution thereof. Forthwith, there is formed a suspension of ferric hydroxide which is then preferably stirred or otherwise vigorously agitated in order that the entire solution be intimately exposed to contact with the flocculent ferric hydroxide. During the course of this exposure, various impurities are adsorbed or absorbed by the ferric hydroxide and carried by it out of solution or suspension upon subsequent sedimentation. While the exact nature of all of these impurities is not definitely known, it is thought that some of them which are exceedingly detrimental to subsequent cobalt electrowinning are of the nature of peptized sulfides.

During the ferric hydroxide treatment, exposure to air is desirable although not essential. Following the treatment with ferric sulfate, the precipitated ferric hydroxide is removed from the thus-purified soda ash or other alkali metal carbonate, by filtration, decantation or the like. Preferably, the alkali metal carbonate solution is filtered to remove the ferric hydroxide precipitated. Thereafter, the solution may be employed in the arts, particularly in the cobalt electrowinning art, as hereinabove explained, or alternatively may be evaporated to dryness and stored as a solid for subsequent use.

The following example illustrates the practice of this invention, but it is not limited thereto:

Commercial soda ash can be sufficiently purified for its use for the preparation of the $CoCO_3$ used for electrowinning cobalt in the following manner: The impurities are precipitated from the concentrated (24° Bé.) soda ash solution by the addition of 0.5 g./l $Na_2S$, BaS, CaS or other soluble sulphides. The excess sulfide is then precipitated by adding the stoichiometrical equivalent of cobalt sulfate. The precipitates are filtered from the solution and to the filtrate, heated to 50–60° C., is added 1.5 g./l ferric sulfate. The suspension is thoroughly agitated and the solids filtered off. Ferrous iron appears to be extremely difficult to oxidize in concentrated soda ash solutions. Hence, ferric iron is added in the final step of the purification in order to form the ferric hydroxide precipitate which removes residual traces of impurities. When the cobalt carbonate precipitated by this purified solution is made into a 30 g./l cobalt electrolyte, it will produce an excellent seven hour plate at room temperature. This is a delicate test of the degree of purification.

It will be seen that the foregoing procedure provides a simple means for purifying soda ash or other alkali metal carbonate. The same procedure can be employed to purify alkali metal hydroxides such as sodium hydroxide, potassium hydroxide, and lithium hydroxide. Besides soda ash, other forms of sodium carbonate as well as potassium carbonate, sodium bicarbonate and potassium bicarbonate may be used.

Since many apparently differing embodiments of the invention will occur to one skilled in the art, various changes can be made therein without departing from the spirit and scope thereof.

What is claimed is:

1. A process for the production of purified soda ash which comprises treating a concentrated solution of commercial soda ash containing impurities which form insoluble sulfides with an excess of soluble inorganic sulfide, removing the formed insoluble sulfide precipitate, then removing residual soluble inorganic sulfide by treatment with at least a chemically equivalent quantity of cobalt sulfate, removing the formed cobalt sulfide precipitate, treating the solution with ferric sulfate to form insoluble ferric hydroxide containing peptized sulfides, then recovering the thus-purified solution of soda ash from the impurity-containing ferric hydroxide residue.

2. The process for the production of purified alkali metal carbonate which comprises treating a concentrated aqueous solution thereof containing also insoluble sulfide-forming impurities, with an excess of sodium sulfide, removing the formed insoluble sulfide precipitate, then treating the solution with a chemically equivalent quantity of cobalt sulfate, removing the formed cobalt sulfide precipitate, then treating the solution with ferric sulfate to form insoluble ferric hydroxide containing peptized sulfides, then removing and recovering the thus purified alkali metal carbonate solution from the ferric hydroxide residue.

3. A process for the production of purified soda ash which comprises treating a concentrated solution of impure soda ash containing insoluble sulfide-forming impurities, said solution having a gravity of about 24° Bé. with about 0.5 gram per liter of sodium sulfide based on soda ash solution, filtering off the formed insoluble sulfide precipitate, then adding about 0.1 to 0.5 gram per liter of cobalt sulfate to the soda ash solution, filtering off the resulting cobalt sulfide precipitate, heating the resulting solution to a temperature of about 50° to 60° C. and adding about 1.5 grams of ferric sulfate per liter of soda ash solution with agitation, filtering off and discarding the resulting ferric hydroxide precipitate containing adsorbed colloids and recovering a purified soda ash solution suitable for use in cobalt electrowinning.

RUTH E. CHURCHWARD.

No references cited.